June 17, 1924.
C. M. HORTON
WELL DRILL FISHING TOOL
Filed Jan. 27, 1923    2 Sheets-Sheet 2
1,498,037
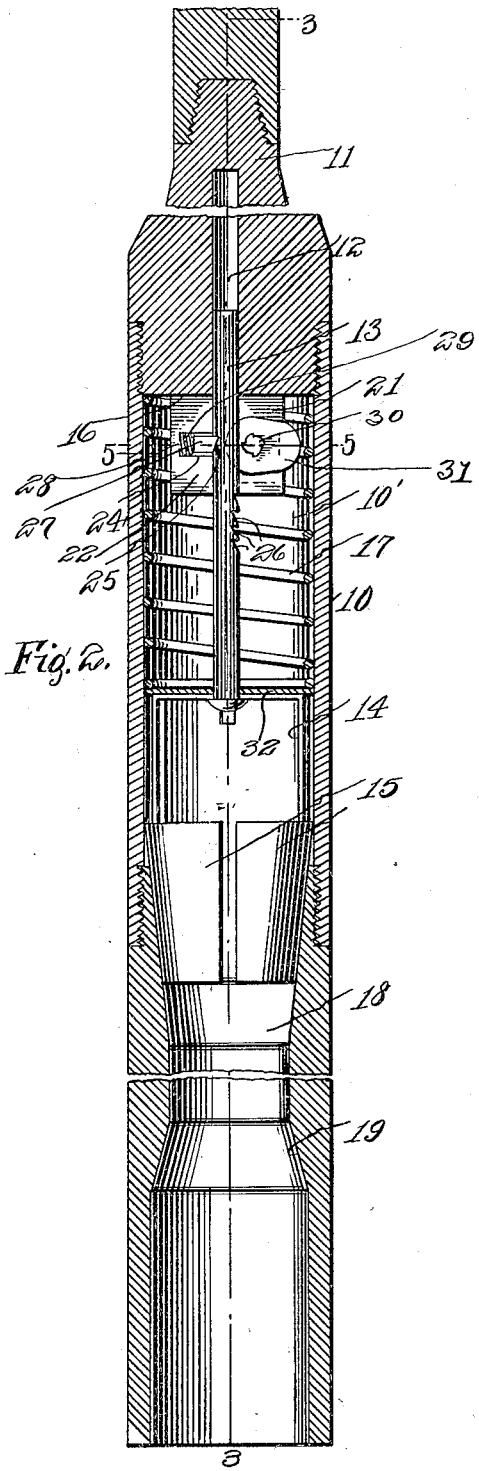
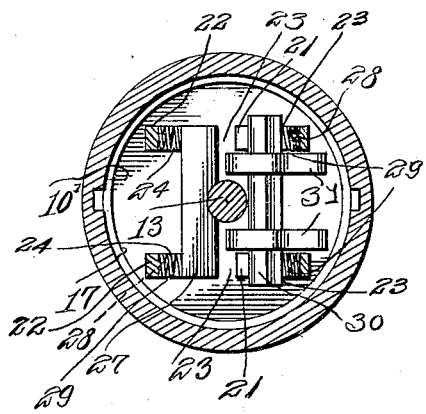
Inventor
Charlie M. Horton.
By
Attorney Patented June 17, 1924.

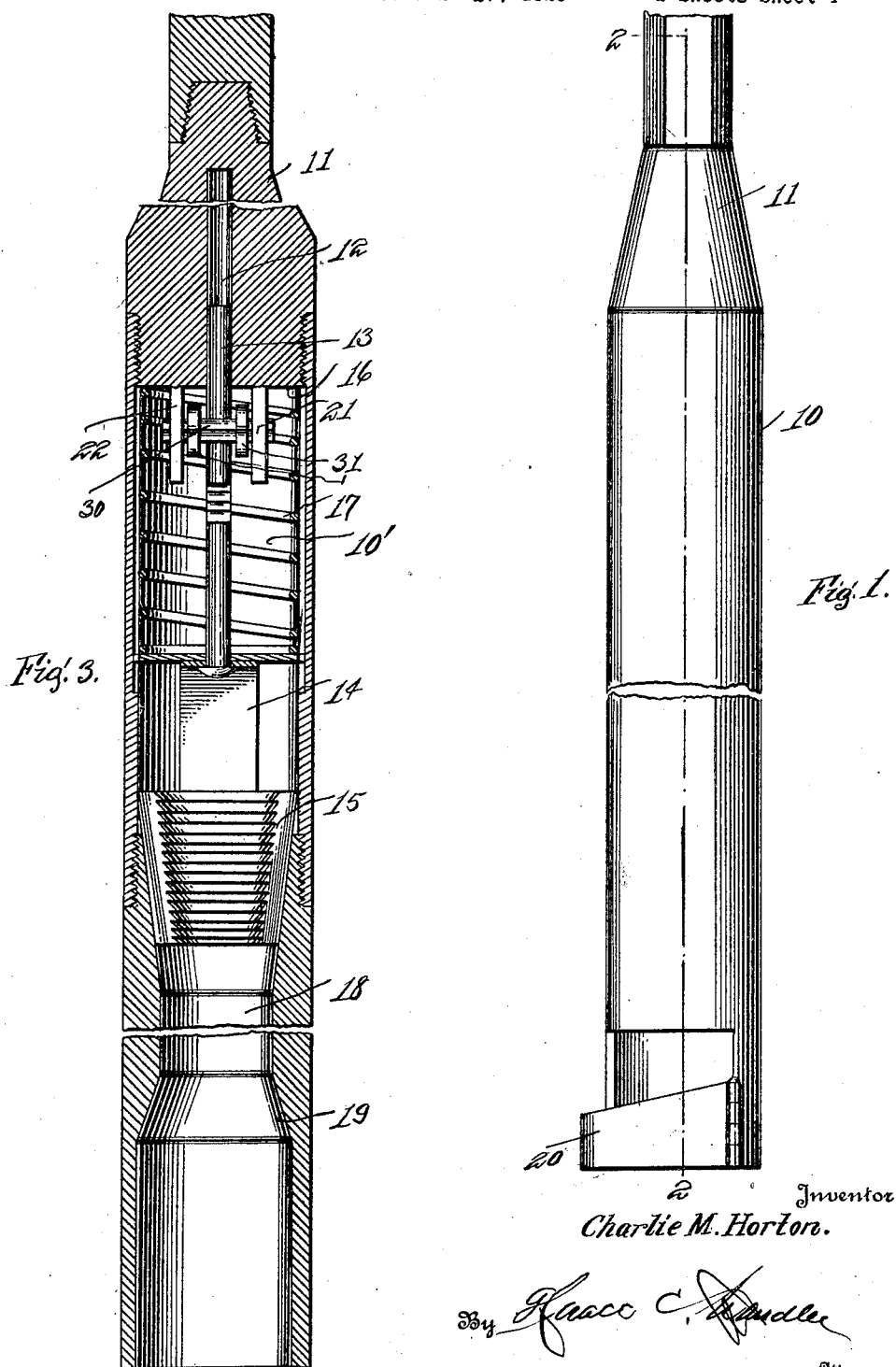

1,498,037

UNITED STATES PATENT OFFICE.

CHARLIE M. HORTON, OF ELECTRA, TEXAS.

WELL-DRILL FISHING TOOL.

Application filed January 27, 1923. Serial No. 615,296.

*To all whom it may concern:*

Be it known that I, CHARLIE M. HORTON, a citizen of the United States, residing at Electra, in the county of Wichita, State of Texas, have invented certain new and useful Improvements in Well-Drill Fishing Tools; and I do hereby declare the following to be a full, clear, and exact description of the invention, such as will enable others skilled in the art to which it appertains to make and use the same.

This invention relates to new and useful improvements in well tools and particularly to devices for use in fishing out broken tools from wells.

One object of the invention is to provide a device of this character which is simple in construction, easy and effective in its operation, formed from few parts, and which can be manufactured at a low cost.

Another object is to provide a device of this character wherein the gripping wedge jaws are so mounted that they may be more properly and accurately guided than in similar devices heretofore.

Another object is to provide a device of this character wherein the easy and quick location of the broken tool, within the well, may be obtained, and the tool properly guided to the gripping jaws, and pulled from the well.

A further object is to provide a device of this character which is simple in construction, and which includes means releasable by the broken tool for gripping the tool or releasing the same.

Other objects and advantages will be apparent from the following description when taken in connection with the accompanying drawing.

In the drawing:

Figure 1 is an elevation of a drill fishing tool made in accordance with the invention.

Figure 2 is a longitudinal sectional view on the line 2—2 of Figure 1.

Figure 3 is a longitudinal sectional view on the line 3—3 of Figure 2.

Figure 4 is a bottom plan view showing the guiding finger.

Figure 5 is a transverse sectional view on the line 5—5 of Figure 2.

Referring particularly to the accompanying drawing, 10 represents an elongated body the upper portion of which is reduced in diameter and solid, as shown at 11, with the longitudinal bore 12 formed centrally therethrough. The upper end of the body is threaded for attachment of a drill rod. Below the solid portion there is formed a chamber 10' within which the rod 13 projects, said rod being slidably disposed in said bore 12. On the lower end of the rod there is secured the bight portion of an angular yoke 14, the same being slidable longitudinally within said chamber, and formed on the lower end of each arm of the yoke is a toothed wedge block 15, which are adapted to be brought into biting and gripping engagement with a broken tool. Encircling the rod 13, within the chamber 10', and bearing with its opposite ends against the bottom wall 16 of the solid upper portion of the body, and the bight portion of the yoke 14, is a coil spring 17, which normally urges the yoke downwardly. The lower portions of the wall of the chamber 10' are inwardly inclined and on these inclined portions the wedge blocks are arranged to slide into and out of tool gripping position. The lower ends of the inclined walls form a central opening 18 through which the stem of the broken tool passes into position between the jaws or wedge blocks 15. In one side of the lower end of the body there is formed an entrance opening 19, and hinged to one wall of this opening is a curved finger 20, the same projecting outwardly beyond the side of the body and being adapted to be scraped around against the wall of the well to scoop in the broken tool, and cause the tool to pass through the opening 19.

Secured to and depending from the wall 16 are the parallel metal plates 21 and 22, in the lower portions of the former of which are formed openings 23, while in the lower portions of the latter are formed the openings or slots 24. In one face of the rod 13 there is formed a single notch 25, and in the opposite face, at a suitable distance below this notch 25, there are formed the series of notches 26. Extending transversely of the first-mentioned face of the rod 13 is a beveled block 27, the beveled edge of which engages in the single notch, while the ends of the block are slidably disposed in the slots or openings 23, in the plates 21. In the rear face of the block, and in the rear wall of each slot 23 there are formed the lugs 28, which receive the respective ends of the coil springs 29, for normally and yieldably urging the block into engagement with the notch 25. Disposed transversely between the plates 22, at the other side of the rod 13, is a longitudinally grooved shaft 30, the ends of which are disposed in the beforementioned notches or slots 24, of the plates 22. Coil springs, disposed in said slots and bearing against the end walls of the slots and the ends of the shaft, serve to yieldably hold the shaft against the adjacent face of the rod, so that the ratchet teeth or notches 26 may engage therewith. On each end of the shaft 30, inwardly of the plates 22, there are fixed the cam disks 31, said disks being so spaced apart as to straddle the rod 13, for engagement with the beveled edge of the block 27, to push the block from the notch 25, when the shaft 30 is rotated.

Between the lower end of the large coil spring 17, and the bight of the yoke 14, is a washer plate 32, which prevents the spring slipping down between the yoke and the side walls of the chamber 10'.

In the operation of the device, for removing a broken tool from a well, and with the parts in their normal position, as shown in the sectional views, the device is lowered into the well, and rotated until the finger 20 engages with the broken tool and draws the same through the opening 19, into the lower end of the casing or body 10. The operator then lets the device down, of its own weight, which will cause the broken tool to press upwardly against the bight of the yoke 14, lifting the same upwardly against the tension of the spring 17 and pushing the rod 13 upwardly into the bore 12. As the rod 13 rises the notches 25 and 26 are carried above the block 27 and the shaft 30. Then, upon permitting the device to lower into the well, that is the yoke 14, under the pressure of the spring 17, the teeth 26 of the rod 13 will engage with the teeth of the shaft 30, causing the same to rotate and the cams 31 to swing over and push the block 27 out of the notch 25, the cams remaining in such position and holding the block out of the notch. The spring 17 can then drive the yoke 14 and the wedge blocks downwardly to engage with the tool. A lifting movement of the device will bring the broken tool out of the well.

Should the broken drill be fixed in the well to such an extent that the device cannot pull it out, the device must then be released from the tool, as the gripping jaws are in tight engagement therewith. To accomplish this, the device is permitted to lower itself into the well until the broken tool pushes the yoke 14 and the rod 13 upwardly, and causes the series of notches 26 to rise above the latches 27 and 30. Then, upon a lifting movement of the device, the yoke and rod will move downwardly causing the teeth or notches 26 to rotate the shaft 30 and swing the cam disks away from the block 27, with the result that the block will reengage in the notch 25, and hold the rod and yoke elevated. The tool will then be freed from the wedge blocks 15, and the device may be readily pulled from the well.

What is claimed is:

1. A well tool extracting device comprising a casing, gripping means within the casing, means for holding the gripping means out of gripping position, said gripping means being movable by a tool, and means operable by the gripping means upon movement thereof by a tool for releasing the holding means.

2. A well tool extracting device comprising a casing, a tool gripping means within the casing, means for moving the gripping means into tool engaging position, means for holding the gripping means out of gripping position, said gripping means being movable by a tool out of tool gripping position, and means operable by the gripping means upon movement of the latter toward gripping position for releasing the holding means.

3. A well tool extracting device comprising a casing, gripping means within the casing including a rod having notches, means for moving the gripping means into gripping position, a detent normally engaged in one of the notches of the rod for holding the gripping means out of gripping position and the notch of the rod away from the detent, said gripping means being movable out of gripping position by a tool, and means operable by said rod upon movement of the gripping means toward gripping position for moving and holding said detent against reengagement in said notch.

4. A well tool extracting device comprising a casing, a tool engaging means in the casing, means for moving the engaging means into engaging position, a detent for holding the engaging means out of engaging position, said engaging means being movable out of engaging position by a tool, and a cam operable by the engaging means upon movement toward engaging position for releasing the detent.

5. A well tool extracting device including tool gripping means, spring means for normally urging said gripping means into gripping position, said gripping means including a rod having a single notch and a series of notches, a detent engaged in the single notch for holding the gripping means out of gripping position, a notched element engageable by the series of notches upon movement of the gripping means away from gripping position and rotatable by the series of notches upon movement toward gripping position, and cams associated with the last-named notched element for engagement with and release of the detent.

6. A well tool extracting device comprising a tool gripping means including a rod having a single notch and a series of notches, a spring for normally urging the gripping means into gripping position, a spring pressed detent engaged in the single notch for holding the gripping means out of gripping position, a notched shaft mounted in position to be engaged and rotated by the series of notches, and a cam carried by and rotated with the notched shaft for releasing the detent to permit the first spring to move the gripping means into gripping position.

In testimony whereof, I affix my signature, in the presence of two witnesses.

CHARLIE M. HORTON.

Witnesses:
T. G. DAVIDSON,
TOM DAVIS.